Jan. 22, 1963 K. M. SANO 3,075,080

CASSETTE LOADER

Filed Jan. 26, 1960 6 Sheets-Sheet 2

Jan. 22, 1963 K. M. SANO 3,075,080

CASSETTE LOADER

Filed Jan. 26, 1960 6 Sheets-Sheet 4

Jan. 22, 1963 K. M. SANO 3,075,080

CASSETTE LOADER

Filed Jan. 26, 1960 6 Sheets-Sheet 5

CASSETTE LOADER

United States Patent Office 3,075,080
Patented Jan. 22, 1963

3,075,080
CASSETTE LOADER

Karel Marcel Sano, Borsbeek-Antwerp, Belgium, assignor to Gevaert Photo-Producten N.V., Mortsel, Belgium, a Belgian company Filed Jan. 26, 1960, Ser. No. 4,694
Claims priority, application Netherlands Jan. 30, 1959
6 Claims. (Cl. 250—66)

The present invention relates to an apparatus for loading sheet film cassettes, particularly for X-ray film.

It is known that a dark room must be used for treating X-ray film.

In British Patent Specification 502,014 is described a method for avoiding this difficulty during the loading of a cassette and for reducing the waste of time involved therewith. The film is in daylight directly withdrawn from a supply box and brought into the cassette through a light-tight slit along which the supply box and the cassette are temporarily in contact with each other. For this purpose is used a cassette with light-tight entrance slot. At the same time, the cassette is brought with the hand into contact with the supply box.

It is further known that if the whole loading operation should run automatically for a cassette of the standard type, the lid of which opens hingingly, the cassette must be brought into a light-tight space which contains a mechanical device in order to open the cassette, to introduce the film and to close the cassette.

Now has been found an automatic apparatus, which unlocks and opens the cassette, whereby the film can be brought into the cassette. Next the cassette is closed again and locked, whereafter the lid on which the cassette lies during treatment turns open so that the loaded cassette can be withdrawn.

It is an adavntage of the present invention that when using the new apparatus the intervention of the laboratory man is limited to laying the empty cassette onto the opened cover of the apparatus. Closing the cover brings the cassette into the suitable position for being opened and loaded and keeps the apparatus light-tight.

An interesting use of the apparatus according to the present invention consists therein that it can be used as link in the complete operation i.e. loading the cassette, exposing the film, developing and finishing the film. The various steps can thus occur without the need of dark room.

A construction according to the features of the present invention is illustrated in the accompanying drawing. Further is given an example of construction wherein the apparatus according to the present invention is preceded by an apparatus for removing film packed in folded wrapper from the same and guiding the film sheet thus obtained to the opened cassette, as described in my copending application Serial No. 4,707, filed January 26, 1960.

In this way is obtained an automatic cassette loading system by starting from a pack of X-ray film packed in folded wrapper.

Figures 1, 4:
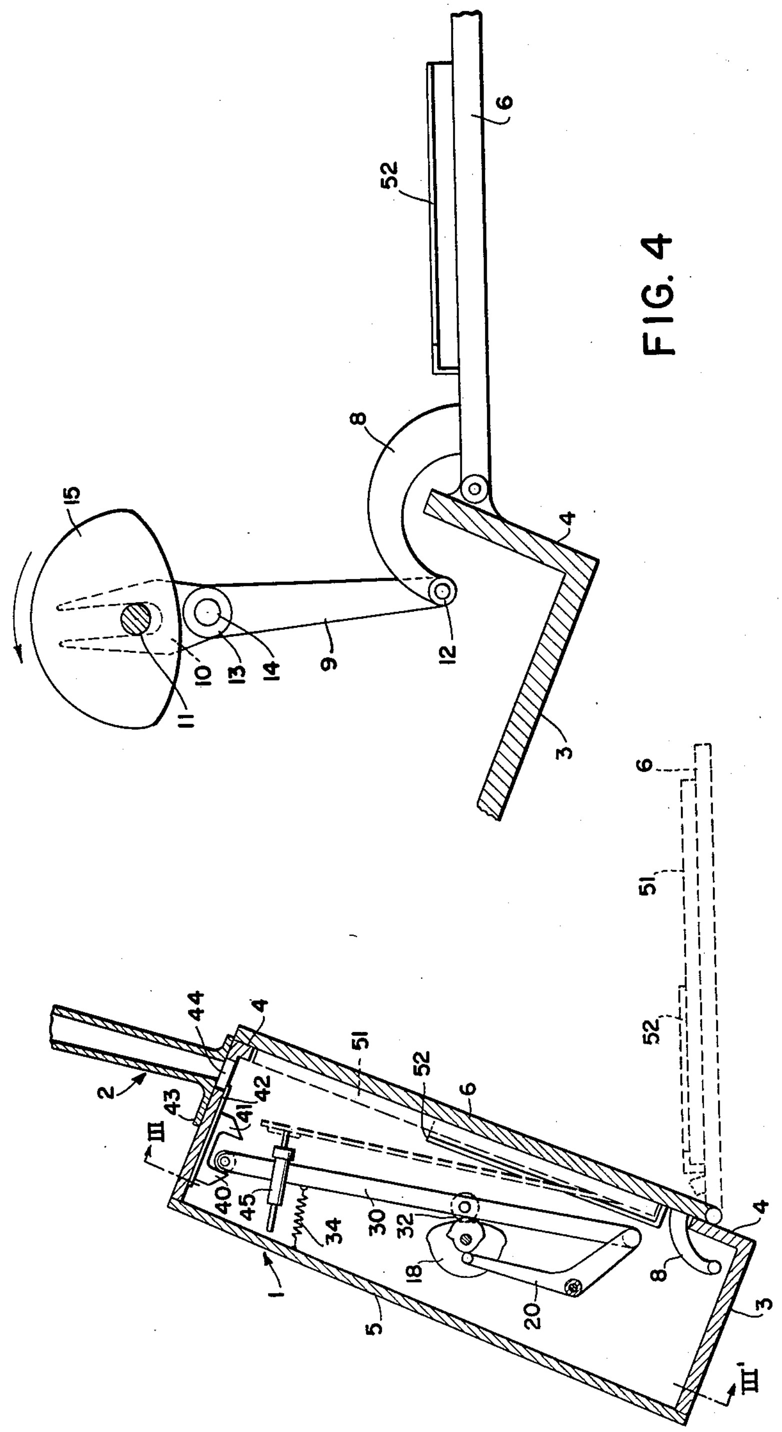
FIG. 1 is a vertical cross section of the apparatus according to the invention on line I—I' of FIG. 3.
FIG. 4 is a side view of the mechanism for opening and closing the apparatus according to the invention.

The apparatus is mounted in a light-tight cabinet 1. A channel 2 forms the light-tight connection between the cabinet 1 and the film supply. The cabinet 1 consists of a frame 3 with an edge 4, a rear wall 5 and a lid hinging around 7 and closing light-tight the cabinet. The lid 6 is opened and closed by means of an arm 8. FIG. 4 shows the mechanism, which controls the movement of the lid 6. An arm 9 rests with its forked end 10 on a turning cam shaft 11 and it is on the other hand fixed by means of the spindle 12 to the arm 8. On the arm 9 a small roller 13 is mounted on the spindle 14. A cam 15 driven by the shaft 11, controls the movement of the arm 9 by way of this roller 13. The arrangement clearly shows that by action of the cam 15 during one complete revolution of the shaft the lid 6 is once gradually opened and closed according to the curve *c* of FIG. 5. In this figure, the revolution of the shaft 11 is linearly plotted from the position 0 to 9. In point 0 of the curve the lid is open and it closes gradually and remains closed from 1 to 8 and afterwards it opens again gradually.

Figure 3:
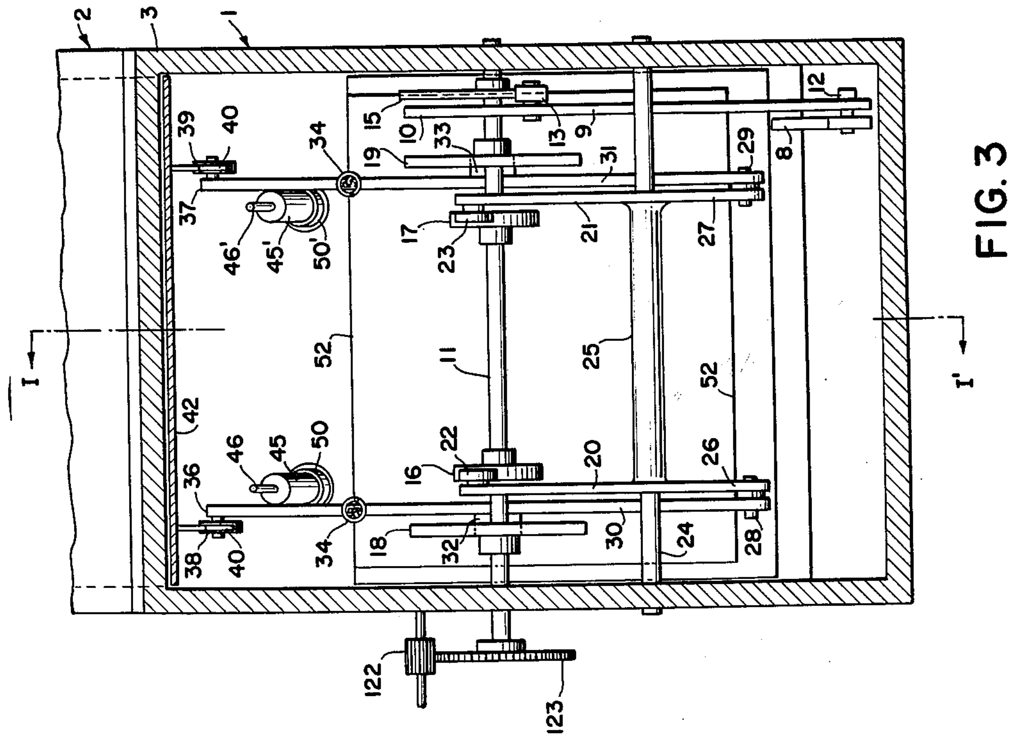
FIG. 3 is a cross section on line III—III' of FIG. 1 of the mechanism according to FIG. 2.
Figure 2:
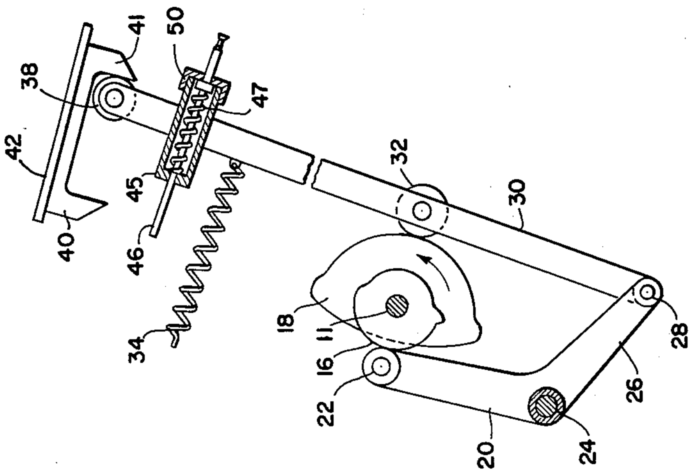
FIG. 2 is a side view of the mechanism for unlocking, opening, loading, closing and locking the cassette.

The cams 16, 17, 18 and 19 are fixed to the same shaft 11 (FIGS. 2 and 3). The cams 16 and 17 respectively control the levers 20 and 21 by means of the rollers 22 and 23. These levers 20 and 21 turn around the shaft 24 and they are joined by an intermediate member 25. The lower ends 26 and 27 are respectively joined by the spindles 28 and 29 to the levers 30 and 31. The small rollers 32 and 33 which are respectively mounted on the levers 30 and 31 are pressed against the cams by springs, such as spring 34 illustrated in FIG. 1. The levers 30 and 31 are provided respectively with the small rollers 38 and 39 which cooperate with the projections 40 and 41 of the slide 42. The object of this slide 42 is to close light-tight the opening 44 when the rollers 32 and 33 respectively are on the high edges of the cams 18 and 19. The slide opens channel 2 when these rollers are on the lowest parts of the cams. The distance between the projections 40 and 41 ensures the standstill of the slide during the movements of the levers 30 and 31 for unlocking and opening the cassette.

Figure 7:
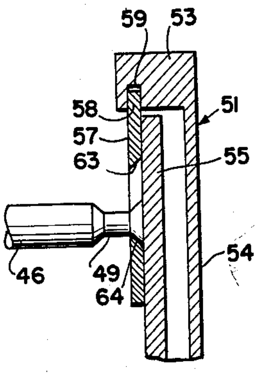
FIG. 7 is the slot of the cassette in cross section on the line VII—VII' of FIG. 8.

The two levers 30 and 31 have also two cylindric members 45 and 45' each of them provided with a rod 46 and 46' having a flange as support for the spring 47 (FIG. 7). Moreover, each rod has on its foremost end a specially conic part 48 and a thinner part 49. The rods are kept in the members 45 by a disc 50.

The ends 36 and 37 of the levers 30 and 31 have a double movement: the first one a turning around the spindles 28 and 29 caused by the cams 18 and 19 and the rollers 32 and 33; the second one an up and down going movement caused by the levers 20 and 21 which by the cams 16 and 17 turn around the shaft 24.

Figure 5:
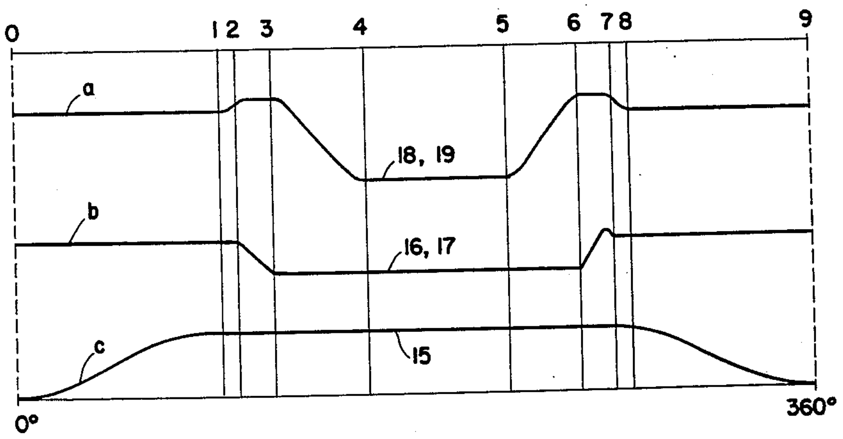
FIG. 5 is the motion diagram of the cams provided in FIGS. 2, 3 and 4.

The first mentioned movement of the levers 30 and 31 by the cams 18, 19 is schematically represented in curve *a* of FIG. 5. Between 0 and 1 the levers 30 and 31 are on the high part of the cam, from 1 to 2 the rollers 32 and 33 run over a projection of the cam where they remain from 2 to 3, whereby the levers 30 and 31 come in the foremost position. From 3 to 4 the levers return and remain in this position from 4 to 5. Afterwards, the second half of the rotation of the shaft 11 starts and the levers move from 5 to 9, symmetrically but in a reverse order with the first cycle.

The second up and down going movement of the levers 30 and 31 is represented by the curve *b* of FIG. 5. There is a descending movement from 2 to 3 and a rising one from 6 to 7, with a short heightened part near 7.

The length of the projections 40 and 41 is sufficient to fall within the range of the rollers 38 and 39 during the rising movement of the levers 30 and 31.

Figure 6:
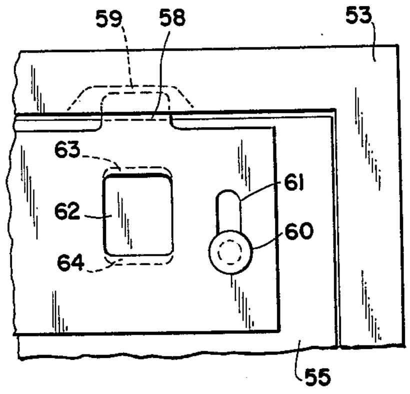
FIG. 6 is the lock of the cassette in front view.
Figure 8:
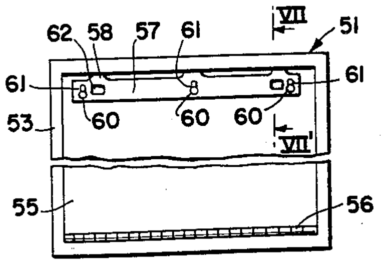
FIG. 8 is a front view of the cassette.

On the inner side, the lid 6 comprises a frame 52 which encloses the cassette 51 on three sides. This cassette 51 (FIGS. 6, 7 and 8) consists of a rectangular frame 53, with a back 54 and a lid 55, provided with a hinge 56 and a locking device 57. This locking device 57 consists of a thin lath with two teeth 58 which cooperate with the notches 59 of the frame 53. The locking device 57 is fixed to the lid 55 by means of screws or rivets 60 mounted in slides 61, so that the locking device can slide in transverse direction. The locking device has also two square holes 62 with sloping sides 63 and 64.

In respect of the holes 62, the rods 46 and 46' are arranged in such a way that the conic end 48 when shutting the lid 55 enters into the hole 62. At the same time, the springs 47 become compressed.

Though the different shafts can be hand-driven, it is obvious that automatical drive by means of an electric motor with adapted switch contacts makes the cassette loader really practical and useful.

Hereinafter follows an ample example of construction wherein driving is carried out electrically. The apparatus according to the invention is herein proceeded by a device which each time takes one packed film from a pack of X-ray film packed in folded wrapper and next brings it into the channel giving access to the cassette loader. In such a way, one disposes of a full-automatic cassette loader. This construction is shown in FIG. 9.

Figure 10:
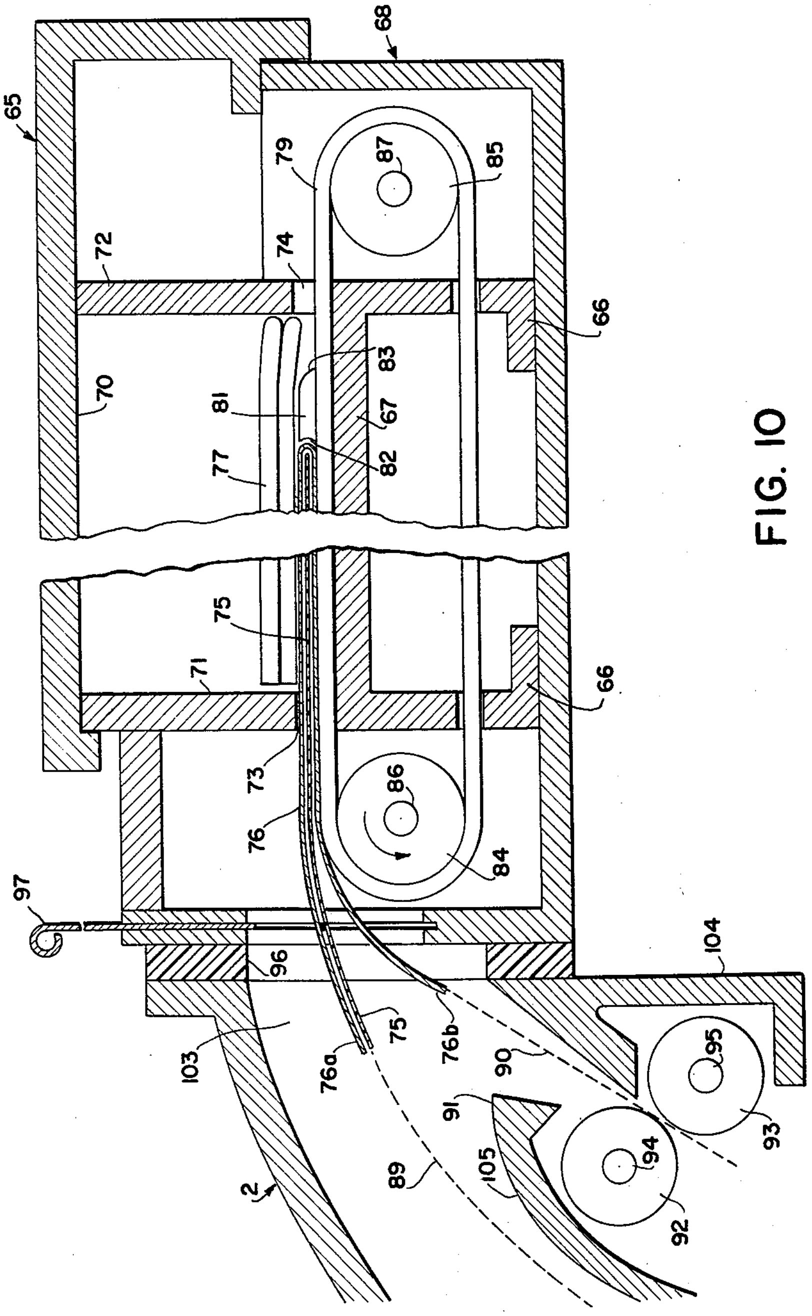
FIG. 10 is a partial longitudinal cross section of the apparatus expulsing the packed film sheets and the apparatus which separates the film sheet from the folded wrapper.

The film container 65 consists of a rectangular frame 66 with top plate 67 enclosed by a light-tight case 68 with side walls 69, a cover 70 a front wall 71 and a rear wall 72. Between the walls 71, 72 and the top plate 67 there are the slots 73 and 74 the height of which is adjusted for giving access to only one film in its paper packing (FIG. 10). In this lower packing, the film 75 and the folded wrapper 76 are marked. The other packings 77 are not marked. Normally a forty packings can be stored in the film holder.

Figure 9:
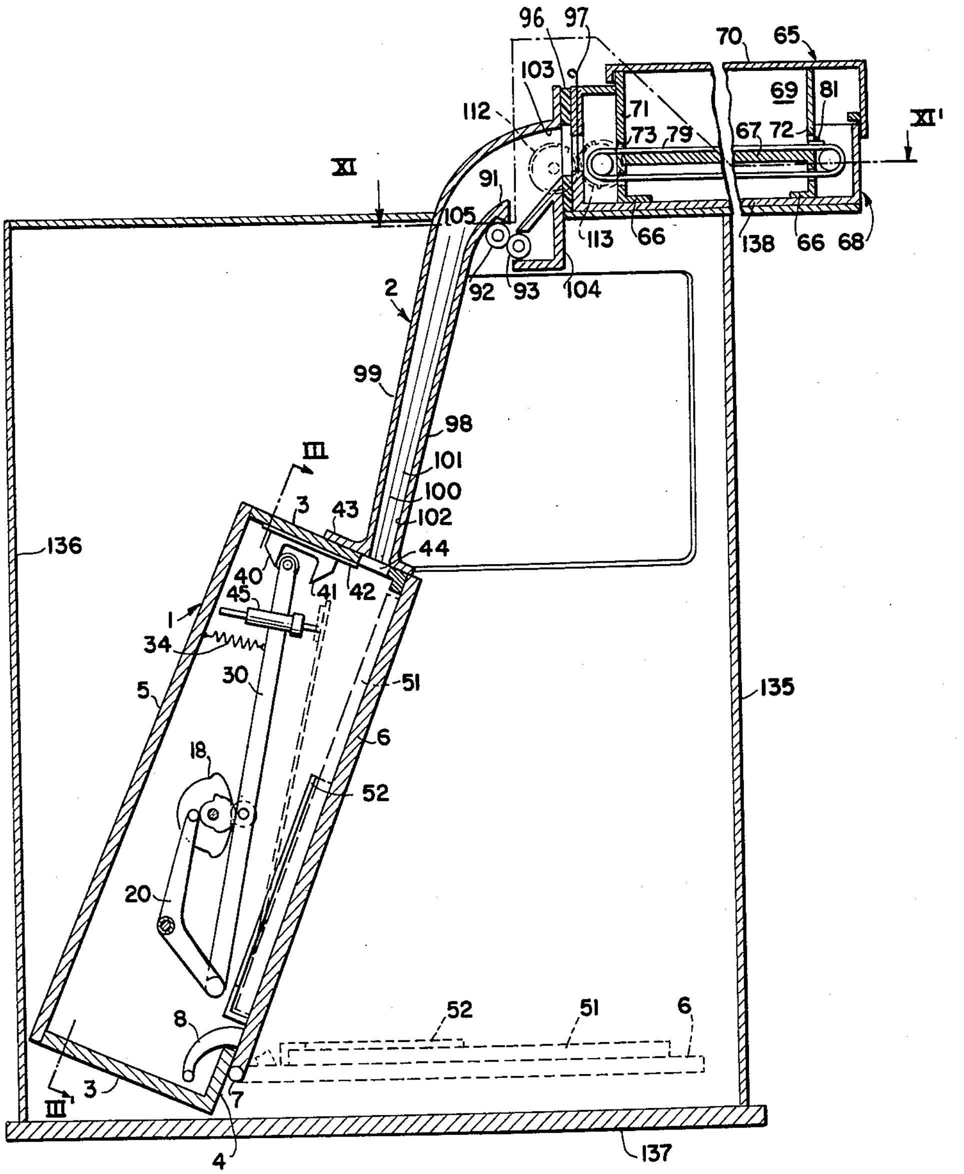
FIG. 9 is a vertical cross section of an automatic cassette loader system on line I—I' of FIGS. 3 and 11.
Figures 11, 12:
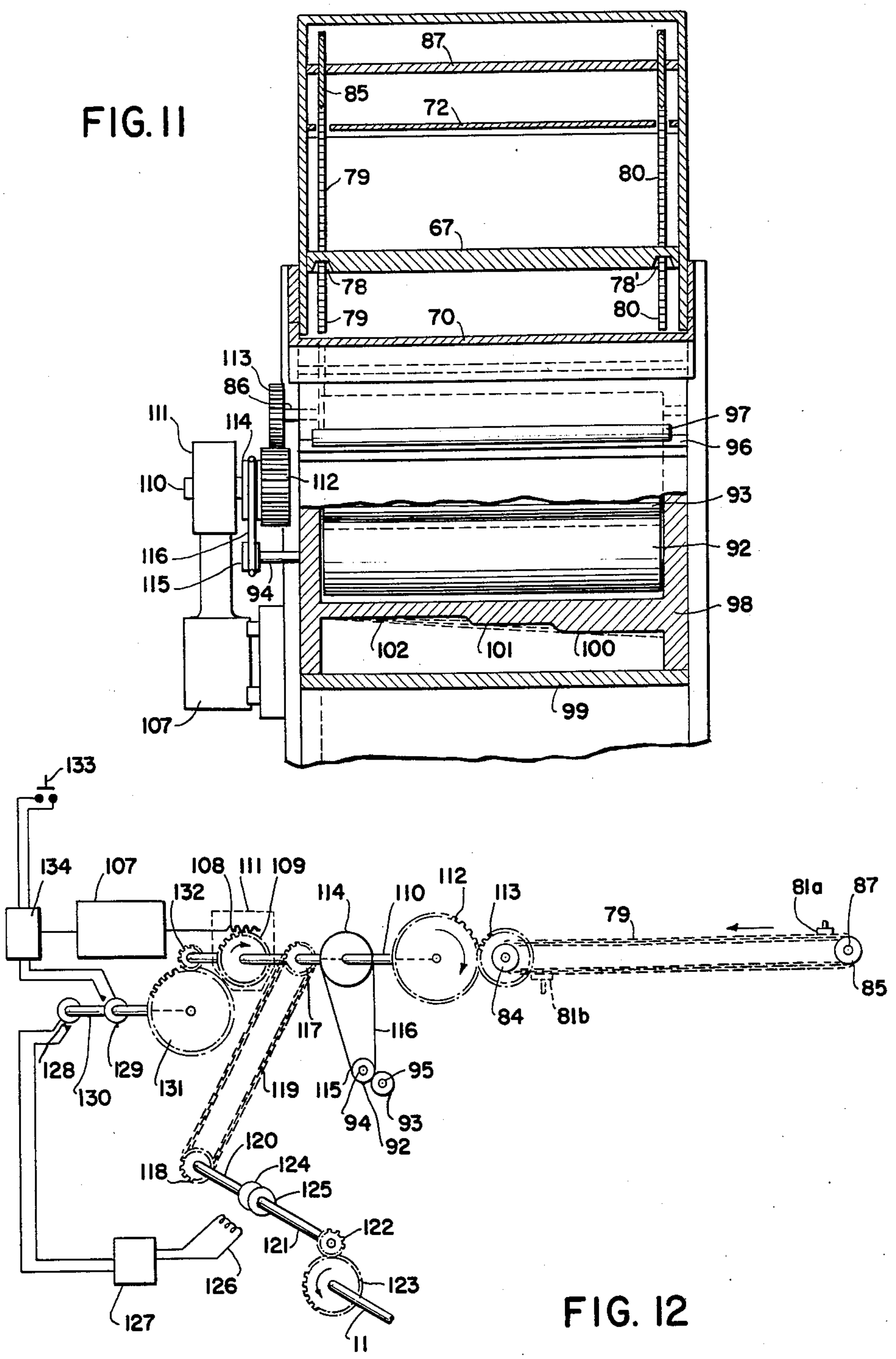
FIG. 11 is a partial cross section of the apparatus for separating the film sheet from the folded wrapper on line XI—XI' of FIG. 9.
FIG. 12 is a scheme of the driving of the automatic cassette loader system.

The top plate 67 is provided with two slots 78 and 78' wherein two chains 79 and 80 run (FIGS. 9, 10, 11). A cross bar 81 showing an excavation 82 at the front side and a rounding 83 at the other side is fixed between these chains. Chain 79 e.g. is tightened on the chain wheels 84—85 mounted on the shafts 86 and 87. The chain 80 is mounted on these shafts in the same way. The shaft 86 is driven by a toothed wheel 113.

In order to expulse a film packing the shaft 86 is turned arrow-wise (FIG. 10). The cross bar pushes the lower film 75 with its folded wrapper 76 forward. The slits 73 and 74 are accurately adjusted on the thickness of the film packing with small tolerance of about +15%. Obviously only one film at the same time can be expulsed.

The film 75 is relatively rigid and only bends down a little because of the gravity, so that it will follow the line 89 when being expulsed. The upper part **76*a* of the folded wrapper 76 rests on the film till it slips into channel 2. The lower part 76*b* of the folded wrapper is free, bends downward and follows line 90. A separating knife 91 ensures the entire separation of the film from folded wrapper. The film 75 becomes freely available on the line 89. The folded wrapper is removed by means of the rollers 92 and 93 which are respectively on the shafts 94 and 95** and which press against each other and are mounted light-tight.

The film container 65 is removable from the cassette loader to which it is fixed and has a light-tight frame 96 made of supple or elastic material. While loading the film container in a dark room it is closed by a slide 97.

The film guiding channel 2 (FIGS. 9, 10 and 11) comprised a rear wall 98 and a front wall 99. At the inner side, the rear wall is provided with step sections 100, 101 and 102. The films of different width, which can be used in the apparatus are vertically conducted by the steps between the sections.

The upper opening 103 of the channel connects light-tight to the film container 65. A member 104 on the full width of the opening gives access to the rollers 92 and 93.

In FIG. 12 the driving scheme of the apparatus is represented. Herein 107 is an electric motor, driving a worm 108 and a worm wheel 109 which operates the transmission shaft 110. Both worm and worm wheel are placed in a gear box 111. On shaft 110 is fixed a toothed wheel 112 which drives the toothed wheel 113 and in this way drives both the chains 79—80 and the cross-bar 81.

On the same shaft 110 is mounted a pulley 114 driving the gripping rollers 92 and 93 over the belt 116 and the pulley 115.

The shaft 110 effectuates a third driving, i.e. that of the levers of the cassette loader 1 over the shaft 11. Therefore are used a chain 119, chain wheels 117 and 118 and the shafts 120 and 121 as well as the toothed wheel-transmissions 122 and 123. In 124 and 125 is shown an electromagnetic clutch operated by a solenoid 126. The solenoid 126 is excited by a control box 127.

The shaft 110 drives two electric contact cams 128 and 129 on shaft 130 by the toothed wheels 131 and 132.

By a short pression on the push button 133, the motor 107 is started by means of the control box 134. The contact, and the resulting motion, is maintained by a cam 129. During this phase the chains 79 and 80 are driven and the cross bar 81 moves arrow wise. The gear ratio is chosen in such a way that the shaft 130 makes about half a revolution to move the bar 81 from the position **81*a* to the position 81*b***, i.e. the first phase.

The contact cam 129 is thus chosen that the motor stops when the point **81*b* of the chain position is reached. The first phase is over. During this phase the contact 128 was open so that 124 and 125 were not coupled and the shaft 11** did not move.

A second short push onto the push button 133 makes the motor turning further and the cam 129 keeps the motor turning till the bar has reached its position **81*a*. At this moment, the current is interrupted by the cam 129**. This is the second phase.

During this second phase, the coupling 124—125 will be realized by the solenoid 126, being excited by the control box 127 and the contact 128. The transmission ratio has been chosen in such a way that the shaft 11 makes just one complete revolution during this phase.

Referring to FIG. 9, the general arrangement is thus that the channel 2 and the cassette loader 1 are mounted above each other between two parallel side walls 135 and 136 and rest on the bottom plate 137. The film container 65 is supported by a horizontal wall 138. This film container 65 is removable and is mounted so that the toothed wheel 113 easily engages with the toothed wheel 112.

The cassette loader system functions as follows:

*First phase.*—The film container is loaded with one or more film packings 77 and the cross bar 81 is in the position **81*a* indicated in FIG. 12. By a short push on the button 133 the motor moves the cross bar 81 and the latter expulses a film 75 packed with a protective paper 76*a*, 76*b* through slot 73 freely hanging forward. The film 75 follows a path 89 and the paper 76*b* a path 90 since this material is thinner and more easily folds. The film 75 slides over the wall 105 into the channel 2 and stops on the closed slide 42 in one of the sections 100, 101 or 102 according to the width of the film. Paper 76 is taken by the rollers 92 and 93** and removed outward.

*Second phase.*—An empty closed cassette is laid on the opened lid 6. By another push on the button 133 both the chains of the film container and the shaft 11 start moving. The lid 6 closes by the intermediary of cam 15 and the arm 9. The ends 48 of rods 46 and 46' push through the entrance openings 62 of the lock 57 against the lid 55 and push it somewhat backward. The levers 30 and 31 go down so that the conic ends 48 engage with the sloping sides 64 of the lock. The latter is pushed further downward and the tooth 58 comes free from the notch 59.

Hereafter the levers 30 and 31 move backward pulling along the lid of the cassette and thus opens the cassette. At the same time the slide 42 is shifted backward since the rollers 38 and 39 pushed against the projections 40. The film in the channel hereby falls free in the opened cassette.

The levers 30 and 31 move forward again so that successively the cassette closes and the lock is shifted again into its place. The slide 42 is likewise closed again. The locking occurs by an upward movement of the spindle 46 the end of which pushes against the side 63 of the lock until the tooth 58 slides in the notch 59. The levers 30 and 31 move a little down back so that the cones 48 come free whereafter the lid 6 with the loader cassette is opened.

During this second phase, the cross bar 81 has moved from position 81*b* to 81*a* and the rollers 92 and 93 have further turned so that also the paper sheet 76 is pulled out.

I claim:

1. Apparatus for use in loading a film cassette in an undarkened room comprising
- (*a*) a cabinet having a top opening and a side opening therein,
- (*b*) door means for closing said side opening,
- (*c*) means for opening and closing said door means in light-tight relation to said cabinet,
- (*d*) said door means having holder means for holding a hinge-type cassette internally of said cabinet,
- (*e*) cassette-lid opening and closing means for opening and closing the lid of a hinge-type cassette,
- (*f*) slide means for sealing said top opening in said cabinet,
- (*g*) means to open said slide means in timed sequence to the opening movement of said cassette-lid opening and closing means and to close said slide means in timed relation to the closing movement of said cassette-lid opening and closing means, so that when said door means is in a closed position and a film is introduced through the top opening of said cabinet said film falls into an open cassette held by said holder means after which the lid of the cassette is closed by the cassette-lid opening and closing means and the top opening of the cabinet is sealed by said slide means.

2. Apparatus for use in loading a film cassette in an undarkened room comprising
- (*a*) a cabinet having a top opening and a side opening therein,
- (*b*) door means for closing said side opening,
- (*c*) means for opening and closing said door means in light-tight relation to said cabinet,
- (*d*) said door means having holder means for holding a hinge-type cassette internally of said cabinet,
- (*e*) cassette-lid opening and closing means for opening and closing the lid of a hinge-type cassette,
- (*f*) slide means for sealing said top opening in said cabinet,
- (*g*) means to open said slide means in timed sequence to the opening movement of said cassette-lid opening and closing means and to close said slide means in timed relation to the closing movement of said cassette-lid opening and closing means,
- (*h*) means for opening and closing said door means in timed sequence with the closing and opening movements respectively of said cassette-lid opening and closing means and the closing and opening movements respectively of said slide means for sealing said top opening of said cabinet, so that when said door means is in a closed position and a film is introduced through the top opening of said cabinet said film falls into an open cassette held by said holder means after which the lid of the cassette is closed by the cassette-lid opening and closing means, the top opening of the cabinet is sealed by said slide means and the door opening and closing means opens the door means to permit the cassette to be removed from the holder means.

3. Apparatus as recited in claim 1 wherein said cassette-lid opening and closing means include:
- (*a*) rod means having a conical portion at one end thereof for engaging and operating the locking mechanism on the lid of a hinge-type cassette,
- (*b*) first lever means operatively connected to said rod means for driving said rod in forward and reverse directions,
- (*c*) first roller means operatively attached to said first lever means at a point intermediate the ends thereof,
- (*d*) first cam means abutting said first roller means for moving said first lever means in forward and reverse directions,
- (*e*) second lever means operatively connected to said first lever means,
- (*f*) second roller means operatively attached to said second lever means opposite the point of connection to said first lever means,
- (*g*) holding means intermediate the ends of said second lever means to prevent said second lever means from moving in a lateral direction,
- (*h*) second cam means operatively abutting said second roller means for moving said second roller means and said second lever means in forward and reverse directions and said first lever means in upward and downward directions in timed relation to the movement of said first cam means,
- (*i*) and driving means for driving said first and second cam means.

4. Apparatus as recited in claim 2 wherein said door opening and closing means include:
- (*a*) first arm means attached to said door means,
- (*b*) second arm means operatively attached to said first arm means and having a forked end portion opposite the point of attachment to said first arm means,
- (*c*) roller means operatively connected to said second arm means,
- (*d*) cam means abutting said roller means for moving said second arm means in upward and downward directions, and
- (*e*) driving means for driving said cam means.

5. Apparatus as recited in claim 2 wherein said slide opening and closing means include:
- (*a*) slide means,
- (*b*) lever means for operatively engaging said slide means to move said slide means in forward and reverse directions,
- (*c*) cam means for moving said lever means in forward and reverse directions, and
- (*d*) driving means for operating said cam means in timed sequence with opening and closing movements of said door means.

6. Apparatus as recited in claim 2 wherein
- (I) said door opening and closing means include:
  - (*a*) first arm means attached to said door means,
  - (*b*) second arm means operatively attached to said first arm means and having a forked end portion opposite the point of attachment to said first arm means,
  - (*c*) first roller means operatively connected to said second arm means,
  - (*d*) first cam means abutting said first roller means for moving said second arm means in upward and downward directions, and (e) first driving means for driving said first cam means, and (II) wherein said cassette-lid opening and closing means include:

(a) rod means having a conical portion at one end thereof for engaging and operating the locking mechanism on the lid of a hinge-type cassette, (b) first lever means operatively connected to said rod means for driving said rod in forward and reverse directions, (c) second roller means operatively attached to said first lever means at a point intermediate the ends thereof, (d) second cam means abutting said second roller means for moving said first lever means in forward and reverse directions, (e) second lever means operatively connected to said first lever means, (f) third roller means operatively attached to said second lever means opposite the point of connection to said first lever means, (g) holding means intermediate the ends of said second lever means for preventing said second lever means from moving in a lateral direction, (h) third cam means operatively abutting said third roller means for moving said third roller means and said second lever means in forward and reverse directions and said first lever means in upward and downward directions in timed sequence to the movement of said second cam means.

(i) second driving means for operating said second and third cam means in timed sequence to said first driving means for driving said first came means of said door opening and closing means.

References Cited in the file of this patent

UNITED STATES PATENTS

| | | |
|---|---|---|
| 2,900,514 | Boucher | Aug. 18, 1959 |
| 2,921,202 | Berger et al. | Jan. 12, 1960 |
| 2,925,761 | Peary et al. | Feb. 23, 1960 |

FOREIGN PATENTS

| | | |
|---|---|---|
| 681,602 | Great Britain | Oct. 29, 1952 |